(12) United States Patent
Huang

(10) Patent No.: US 12,643,748 B2
(45) Date of Patent: Jun. 2, 2026

(54) DATA COLLECTION AND ANALYSIS BY VEHICLES IN AN INDEPENDENT CART SYSTEM

(71) Applicant: Rockwell Automation Technologies, Inc., Mayfield Heights, OH (US)

(72) Inventor: Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 323 days.

(21) Appl. No.: 18/420,968

(22) Filed: Jan. 24, 2024

(65) Prior Publication Data

US 2025/0236474 A1     Jul. 24, 2025

(51) Int. Cl.
B65G 54/02          (2006.01)
H02K 41/03          (2006.01)

(52) U.S. Cl.
CPC ........... B65G 54/02 (2013.01); H02K 41/031 (2013.01); *H02K 41/03* (2013.01)

(58) Field of Classification Search
CPC ....... B65G 54/02; H02K 41/03; H02K 41/031

USPC ......................................................... 198/805
See application file for complete search history.

(56) References Cited

U.S. PATENT DOCUMENTS

| | | | | |
|---|---|---|---|---|
| 11,459,181 B2 * | 10/2022 | Huang | .................... | H02P 6/006 |
| 11,634,287 B2 * | 4/2023 | Yamasaki | .............. | C12M 23/50 |
| | | | | 198/805 |
| 2021/0265188 A1 * | 8/2021 | Moura | .............. | H01L 21/67742 |
| 2023/0085908 A1 | 3/2023 | Gardner et al. | | |
| 2024/0059327 A1 * | 2/2024 | Huang | .................... | B61B 13/00 |
| 2024/0255368 A1 * | 8/2024 | Gardner | .................. | G01L 5/042 |

* cited by examiner

*Primary Examiner* — James R Bidwell
(74) *Attorney, Agent, or Firm* — Boyle Fredrickson, S.C.

(57) ABSTRACT

A system for collecting data about an environment in which an independent cart system is operating includes a track extending through the environment, a mover mounted on the track and operative to travel along the track, and a sensor mounted on the mover. The sensor generates a feedback signal corresponding to a condition external from the mover as the mover travels along the track. A memory is operative to store multiple instructions and multiple values of the feedback signal. A controller is operative to execute the instructions to receive the feedback signal from the sensor and periodically store a value of the feedback signal in the memory.

20 Claims, 9 Drawing Sheets

DATA COLLECTION AND ANALYSIS BY VEHICLES IN AN INDEPENDENT CART SYSTEM

BACKGROUND INFORMATION

The subject matter disclosed herein relates to a system and method for monitoring and collecting data about an environment in which an independent cart system is installed. More specifically, a camera or other sensor is mounted to a vehicle in the independent cart system to record data about the operating environment in which the independent system is installed as the vehicle travels along a track.

Motion control systems utilizing independent cart technology employ a linear drive system embedded within a track and multiple vehicles, also referred to as "movers" or carts, that are propelled along the track via the linear drive system. Movers and linear drive systems can be used in a wide variety of processes (e.g. packaging, manufacturing, and machining) and can provide an advantage over conventional conveyor belt systems with enhanced flexibility, extremely high-speed movement, and mechanical simplicity. The independently controlled movers or carts are each supported on a track for motion along the track.

Recent developments in independent cart technology have seen a growth in the utilization of the systems and deployment in increasingly diverse applications. The independent cart system may be utilized, for example, along process lines with hazardous operating environments or with multiple parallel paths along an automated manufacturing or pick and place process. The hazardous environment or the arrangement of the track with respect to the automated process may make it challenging for a technician to monitor operation of the process served by the independent cart system.

Thus, it would be desirable to provide a system and method by which the movers on the independent cart system may monitor the operating environment and/or the process external to the independent cart system as the movers travel along the track through the environment.

BRIEF DESCRIPTION

According to one embodiment of the invention, a system for collecting data about an environment in which an independent cart system is operating includes a track extending through the environment, a mover mounted on the track and operative to travel along the track, and a sensor mounted on the mover. The sensor generates a feedback signal corresponding to a condition external from the mover as the mover travels along the track. A memory is operative to store multiple instructions and multiple values of the feedback signal. A controller is operative to execute the instructions to receive the feedback signal from the sensor and periodically store a value of the feedback signal in the memory.

According to another embodiment of the invention, a method for collecting data about an environment in which an independent cart system is operating controls a mover to travel along a track of the independent cart system, where the track extends through the environment. A feedback signal is received at a controller from a sensor mounted on the mover, and the sensor generates the feedback signal corresponding to a condition external from the mover as the mover travels along the track. A value of the feedback signal is periodically stored in a memory in communication with the controller, and a trend in the feedback signal is detected as a function of the values of the feedback signal stored in the memory.

According to yet another embodiment of the invention, a system for collecting data about an environment in which an independent cart system is operating includes a sensor mounted on a mover operative to travel along a track for the independent cart system and a memory operative to store multiple instructions and multiple values of the feedback signal. The sensor generates a feedback signal corresponding to a condition external from the mover as the mover travels along the track. A controller is operative to execute the instructions to receive the feedback signal from the sensor, periodically store a value of the feedback signal in the memory, and detect at least one trend in the feedback signal as a function of the plurality of values of the feedback signal.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
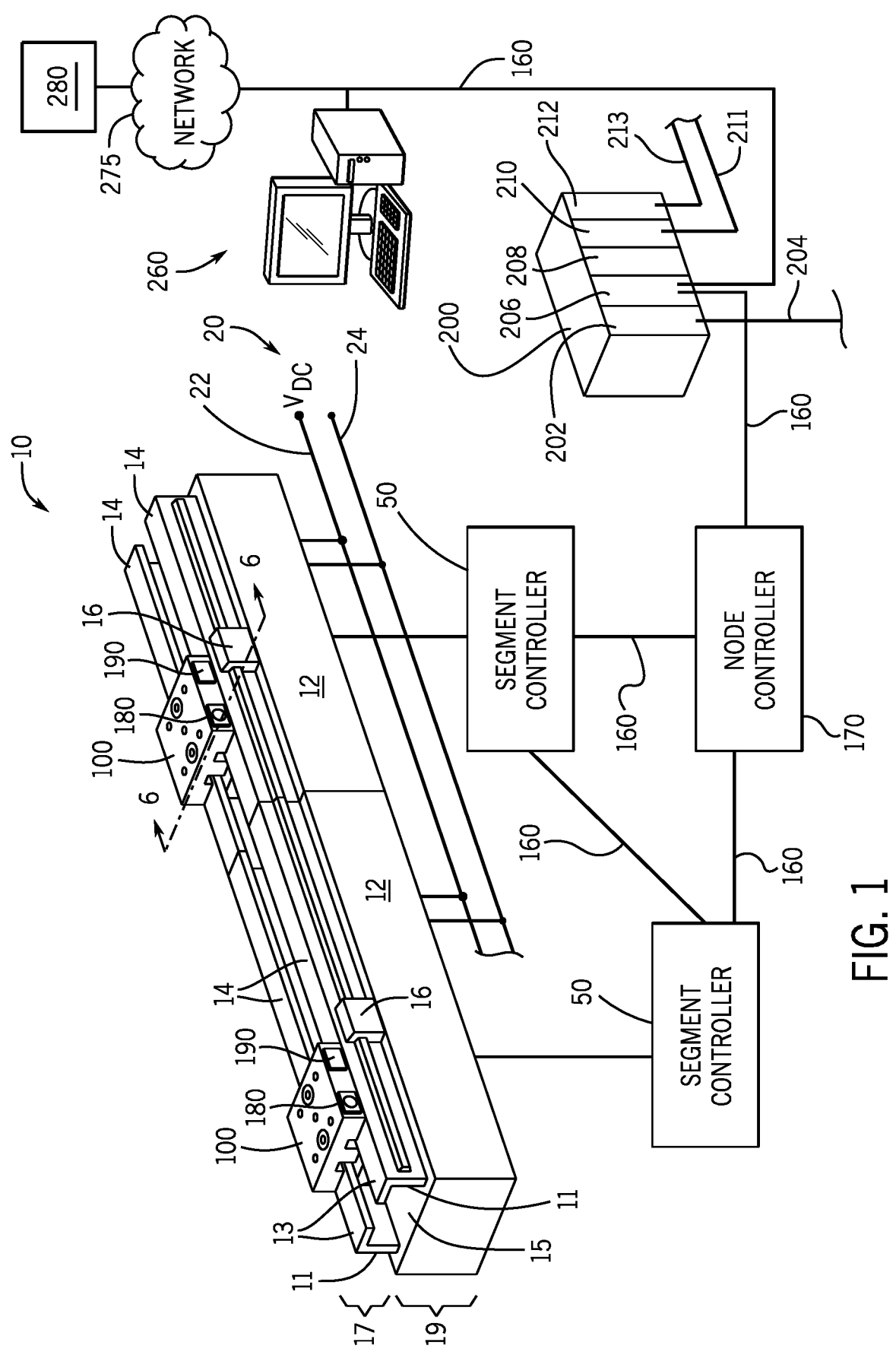
FIG. 1 is a schematic representation of an exemplary control system for an independent cart system according to one embodiment of the invention.
Figure 2:
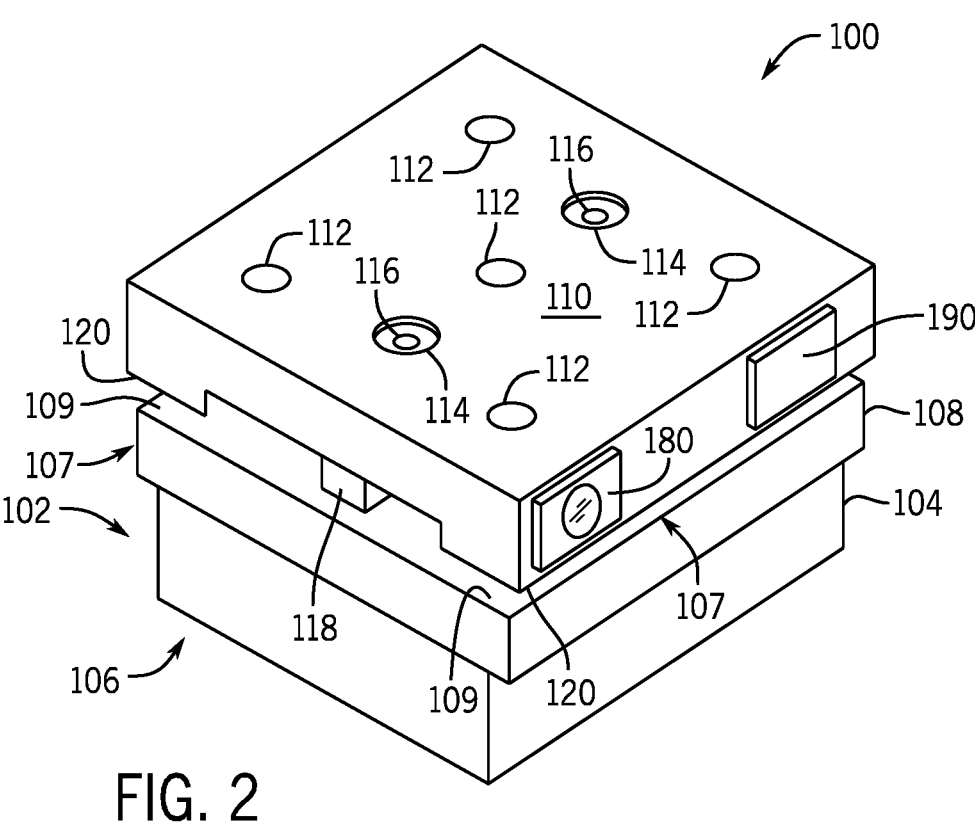
FIG. 2 is a perspective view of one embodiment of a mover configured to travel along the track of FIG. 1.
Figure 3:
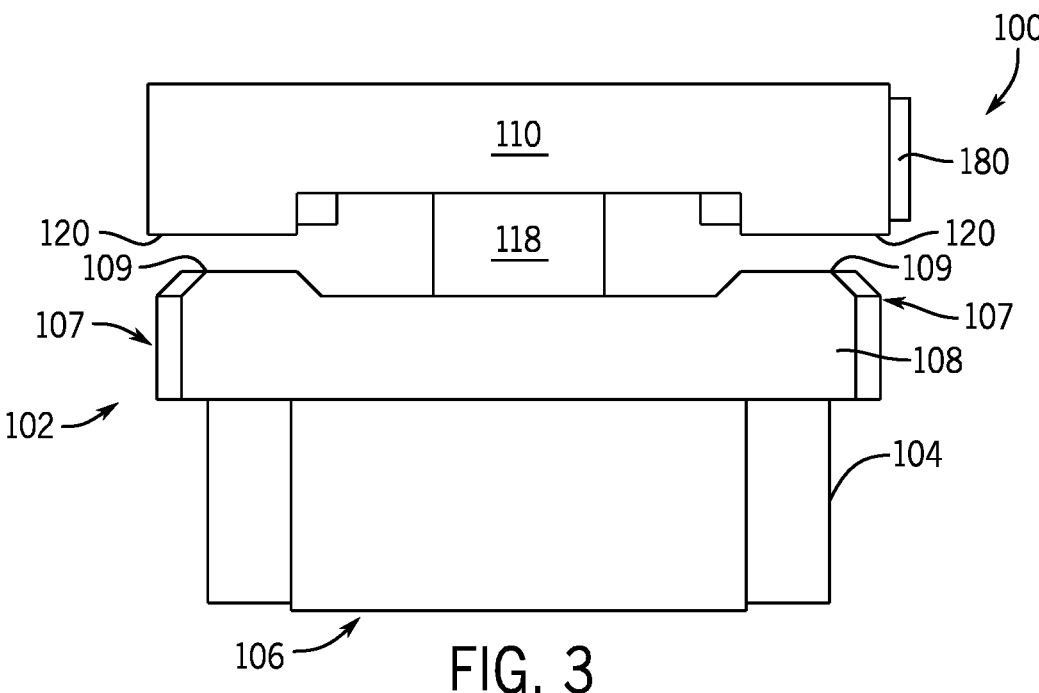
FIG. 3 is a front elevational view of the mover of FIG. 2.
Figure 4:
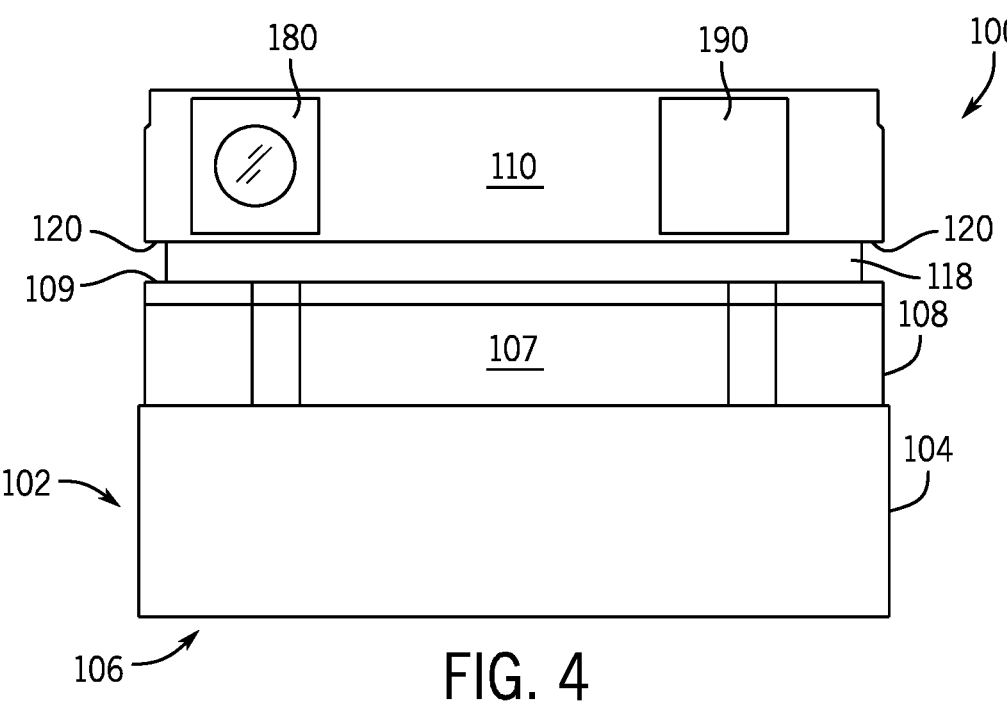
FIG. 4 is a side elevational view of the mover of FIG. 2.
Figure 5:
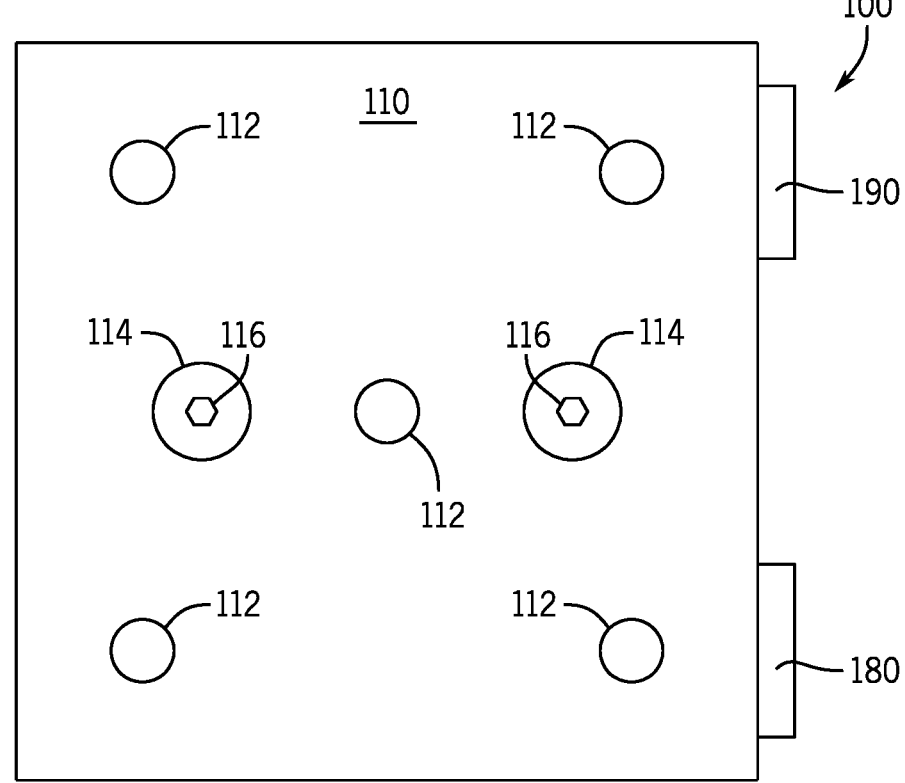
FIG. 5 is a top plan view of the mover of FIG. 2.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method by which the movers on the independent cart system may monitor the operating environment and/or the process external to the independent cart system as the movers travel along the track through the environment. A camera or other sensor is mounted to the mover to generate a feedback signal corresponding to the operating environment. A camera may take still images and/or record video as the mover travels along the track. Other sensors may be used to detect, for example, temperature or humidity of the ambient environment. The images, video, or other feedback signals may be stored in memory on the mover or transmitted to a controller for a track segment on which the mover is located. Images may be used, for example, in inventory tracking, equipment inspection, or the like. A sensor monitoring temperature may be useful for a mover passing through an oven as a payload on the mover receives a heat treatment. The images or other feedback signals may undergo some initial processing on the mover and the processed signals and/or the original feedback signals may be transmitted back to another controller for further analysis or processing.

Turning initially to FIG. 1, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, right-hand switches, left-hand switches, and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a pair of rails 14 extending longitudinally along the upper portion 17 of each track segment 12 and defining a channel 15 between the two rails. Clamps 16 affix to the sides of the rails 14 and secure the rails 14 to the lower portion 19 of the track segment 12. Each rail 14 is generally L-shaped with a side segment 11 extending in a generally orthogonal direction upward from the lower portion 19 of the track segment 12, and a top segment 13 extending inward toward the opposite rail 14. The top segment 13 extends generally parallel to the lower portion 19 of the track segment 12 and generally orthogonal to the side segment 11 of the rail 14. Each top segment 13 extends toward the opposite rail 14 for only a portion of the distance between rails 14, leaving a gap between the two rails 14. The gap and the channel 15 between rails 14 define a guideway along which the movers 100 travel.

According to one embodiment, the surfaces of the rails 14 and of the channel 15 are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. According to one aspect of the invention, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

Turning next to FIGS. 2-5, one embodiment of the mover 100 is configured to slide along the channel 15 as it is propelled by a linear drive system. The mover 100 includes a body 102 configured to fit within the channel 15. The body 102 includes a lower portion 104, configured to hold magnets 130 (see also FIG. 6), and an upper portion 108, configured to engage the rails 14. The lower portion has a lower surface 106 to slide along the bottom surface of the channel 15. The upper portion 108 includes side contacting surfaces 107 which slide along an interior surface of the side segments 11 of the rails 14 and upper contacting surfaces 109 which slide along an interior surface of the top segments 13 of the rails 14. The mover 100 also includes a platform 110 mounted to the body 102 of the mover. An upper surface of the platform 110 includes multiple threaded openings 112 to which a fixture, or workpiece, may be mounted. Various workpieces, clips, fixtures, and the like may be mounted on the top of each platform 110 for engagement with a product to be carried along the track by the mover 100 according to an application's requirements. The platform 110 also includes a pair of openings 114 through which a threaded fastener 116 such as a bolt may be used to secure the platform 110 to the body 102 of the mover 100. A central guide portion 118 of the platform 110 extends downward toward the body 102 of the mover 100. The central guide portion 118 has a width less than the gap between the two rails 14 and fits within the gap between rails when the mover 100 is mounted on the track. The central guide portion 118 also extends further than lower contacting surfaces 120 on the platform 110 creating a gap between the upper contacting surfaces 109 of the body 102 and the lower contacting surfaces 120 of the platform 110 equal to the width of the top segment 13 of the rails 14 such that the lower contacting surfaces 120 of the platform 110 slide along an exterior surface of the top segments 13 of the rails. According to the illustrated embodiment, the platform 110 is generally square and has a sectional area similar to the sectional area of the body 102 as viewed from the top of the mover 100. It is contemplated that platforms 110, or attachments, of various shapes may be secured to the body 102.

According to the illustrated embodiment, the platform 110 also includes a camera 180 and an additional sensor 190 mounted to the side of the platform. Optionally, a camera 180 may be mounted to the front, rear, top, and/or to both sides of the platform 110. The camera 180 is pointed away from the mover 100 and is used to detect operating conditions along the track 10 or with equipment mounted external to the track. Similarly, one or more additional sensors 190 may be mounted to the front, rear, top, and/or to both sides of the platform 110. The additional sensors 190 may include, but are not limited to, a temperature sensor, a humidity sensor, an acoustical sensor, an infrared sensor, or the like to detect still other operating conditions along the track 10 or to detect operating conditions of equipment mounted external to the track.

Figures 6, 7:
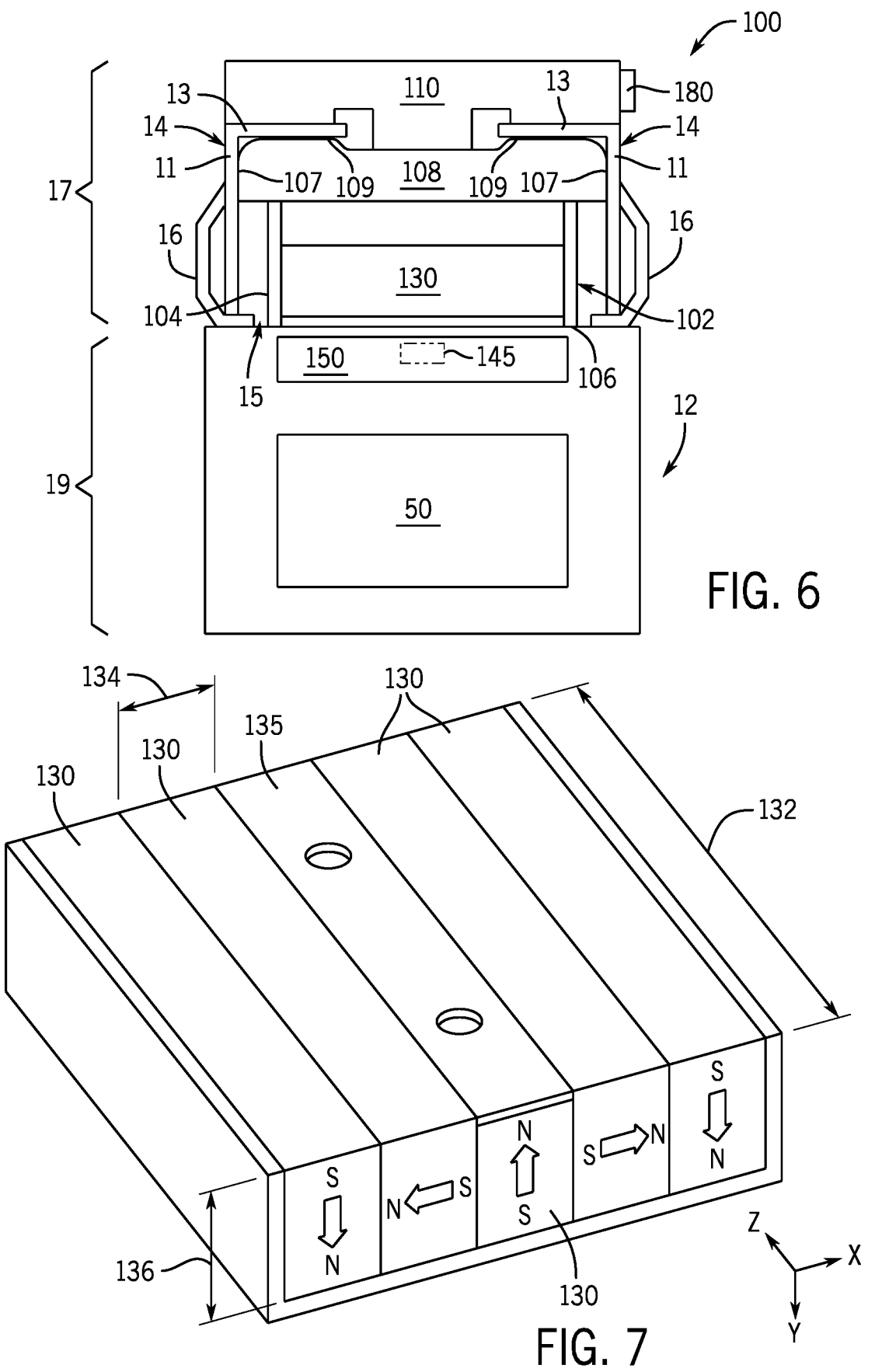
FIG. 6 is a sectional view of one embodiment of a mover and track segment included in the linear drive system taken at 6-6 of FIG. 1.
FIG. 7 is a perspective view of one embodiment of a magnet array used within the mover of FIG. 6.

The mover 100 is carried along the track 10 by a linear drive system. The linear drive system is incorporated in part on each mover 100 and in part within each track segment 12. One or more drive magnets 130 are mounted to each mover 100. With reference to FIG. 6, the drive magnets 130 are arranged in a block on the lower surface of each mover. With reference also to FIG. 7, the illustrated embodiment includes five drive magnets 130 placed adjacent to each other in a Halbach array to define the block of magnets. Each magnet 130 has a length 132 extending in the z-axis, a width 134 extending in the x-axis, and a height 136 extending in the y-axis. From left-to-right in FIG. 7, a first drive magnet 130 has a north pole oriented along a y-axis toward the track when the mover 100 is mounted on the track. A second drive magnet 130 has a north pole oriented along an x-axis, and a third drive magnet 130 has a north pole oriented along the y-axis away from the track. A fourth drive magnet 130 has a north pole oriented along the x-axis in a direction opposite the second magnet, and a fifth drive magnet 130 has the north pole again oriented toward the track along the y-axis. As also illustrated, an orientation of the magnetic field is illustrated by the arrow pointing from the south pole toward the north pole. For movers 100 having a greater length, this rotation of the orientation for the drive magnets 130 may continue along the length of the mover 100. The Halbach array configuration has an advantage of cancelling magnetic flux tending to extend upward into the rest of the mover 100 while increasing the magnetic flux tending to extend downward toward the track for interaction with the linear drive system. The illustrated embodiment for the arrangement of drive magnets 130 is not intended to be limiting. Various other configurations of the drive magnets 130 may be utilized as non-illustrated embodiments of the invention.

Figure 8:
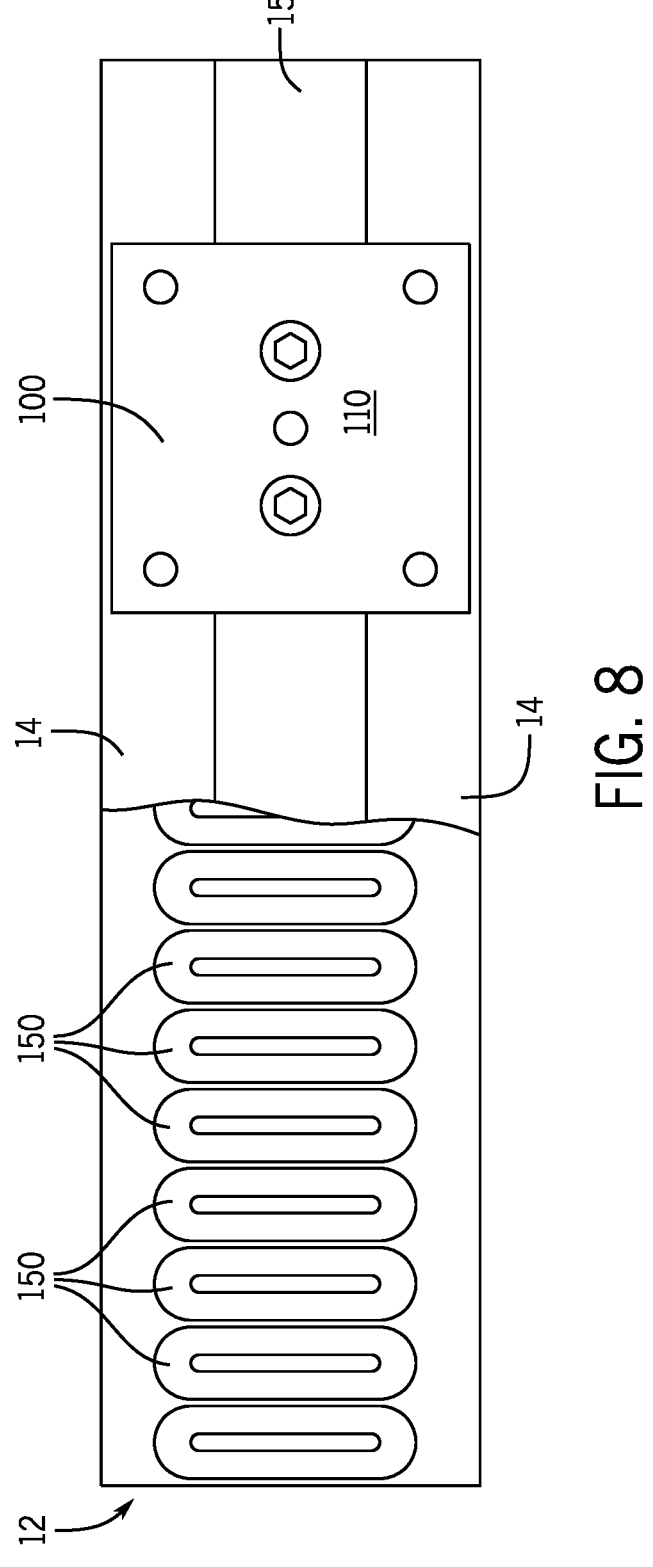
FIG. 8 is a partial top cutaway view of the mover and track segment of FIG. 1.

The linear drive system further includes a series of coils 150 spaced along the length of the track segment 12. With reference also to FIG. 8, the coils 150 may be positioned within a housing for the lower portion 19 of the track segment 12 and below the surface of the channel 15. The coils 150 are energized sequentially according to the configuration of the drive magnets 130 present on the movers 100. The sequential energization of the coils 150 generates a moving electromagnetic field that interacts with the magnetic field of the drive magnets 130 to propel each mover 100 along the track segment 12.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 6, it is contemplated that each segment controller 50 may be mounted in the lower portion 19 of the track segment 12. Each segment controller 50 is in communication with a node controller 170 which is, in turn, in communication with an industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the node controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a node controller 170 where the node controller 170 operates to generate commands for each segment controller 50.

As further illustrated in FIG. 1, the independent cart system may include a local, edge controller 260, a remote application executing and hosted in a data processing center 280, or a combination thereof. The edge controller 260 is connected to the industrial controller 200 via the network medium 160. If a remote application is being used, the edge controller 260 and/or the industrial controller 200 is connected to the data processing center 280 via a suitable network 275. The network 275 may include a local intranet, the Internet, or a combination thereof. The network 275 may be wired or wireless, including Wi-Fi or cellular communications over a single channel or multiple channels.

Figure 9:
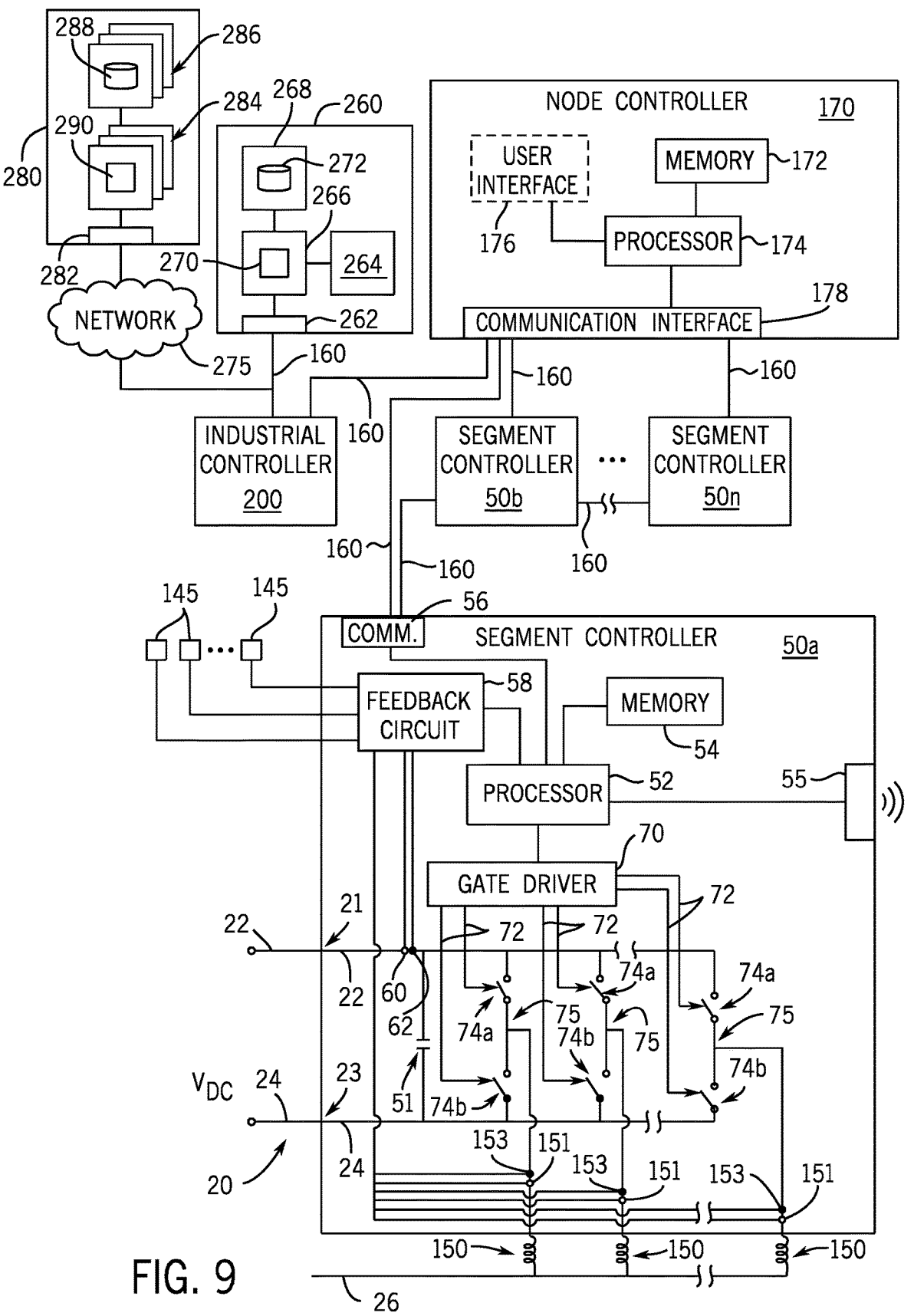
FIG. 9 is a block diagram representation of the exemplary control system of FIG. 1.

With reference also to FIG. 9, the edge controller 260 includes a communication interface 262 to connect to the network medium 160. The communication interface 262 is configured to transmit and receive data packets between the network and a processor 266 present in the edge controller 260. The edge controller 260 includes the processor 266 and memory 268. It is contemplated that the processor 266 and memory 268 may each be a single electronic device or formed from multiple devices. The processor 266 may be a microprocessor. Optionally, the processor 266 and/or at least a portion of the memory 268 may be integrated on a field programmable gate array (FPGA) or an application specific integrated circuit (ASIC). The memory 268 may include volatile memory, non-volatile memory, or a combination thereof. The memory 268 may further include fixed or removable storage medium, such as a magnetic or solid-state hard disk drive, a fixed or removable memory card, an optical drive, or a combination thereof. An optional user interface 264 may be provided for an operator to interface with the edge controller 260. The user interface 264 may include a monitor, keyboard, mouse, trackball, touch pad, touch screen, or any other suitable device to receive input from or display data to a user. Optionally, the edge controller 260 may be accessed via the network 275 from a remote device.

The edge controller 260 is configured to execute one or more applications 270 on the processor. The edge controller 260 may execute independently or in combination with the data processing center 280. The edge controller 260 may execute a machine learning model corresponding to the independent cart system and to the environment external to the independent cart system. The memory 268 is configured to store a database 272 including rules for the machine learning model, a history of reference and/or feedback signals from the independent cart system, a history of feedback signals from the camera 180 or other sensors 190 mounted on the mover, and patterns, or trends, detected within the independent cart system and in the environment external to the independent cart system. As a mover 100 is commanded to travel along the track 10, the camera 180 and/or other sensor(s) 190 generate feedback signals corresponding to the environment in which the independent cart system is deployed. The machine learning model uses the historical data from the feedback signals and/or rules stored within the database 272 to identify trends or other conditions present in the external environment.

Similarly, a data processing center 280 includes a communication interface 282. The communication interface 282 provides access to the network 275 and transmits data packets between the data processing center 280 and the industrial controller 200 or the edge controller 260. Although illustrated as a single data processing center, the data processing center may be distributed among multiple facilities providing Infrastructure as a Service (IaaS) or Platform as a Service (PaaS), where the IaaS or PaaS host the application executing thereon as Software as a Service (SaaS). The data processing center 280 further includes multiple processing units 284 and multiple storage units 286. One or more of the processing units 284 is configured to execute applications 290 such a machine learning model. The applications 290 are in communication with the storage units 286 to store data to and read data from one or more databases 288 stored on one or more storage units 286. Operation of the machine learning model will be discussed in more detail below.

With reference also to FIG. 9, the node controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the node controller 170 and to load or configure desired motion profiles for the movers 100 on the node controller 170. Optionally, the configuration may be performed via a remote device connected via a network and a communication interface 178 to the node controller 170. It is contemplated that the node controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the node controller 170 and user interface may be an industrial computer mounted within a control cabinet and configured to withstand harsh operating environments. It is contemplated that still other combinations of computing devices and peripherals as would be understood in the art may be utilized or incorporated into the node controller 170 and user interface 176 without deviating from the scope of the invention.

The node controller 170 includes one or more programs stored in the memory device 172 for execution by the processor 174. The node controller 170 receives a desired position from the industrial controller 200 and determines one or more motion profiles for the movers 100 to follow along the track 10. A program executing on the processor 174 is in communication with each segment controller 50 on each track segment via a network medium 160. The node controller 170 may transfer a desired motion profile to each segment controller 50. Optionally, the node controller 170 may be configured to transfer the information from the industrial controller 200 identifying one or more desired movers 100 to be positioned at or moved along the track segment 12, and the segment controller 50 may determine the appropriate motion profile for each mover 100. Various features of the present application will be discussed herein as being executed within the segment controller 50, the industrial controller 200, and the node controller 170. As illustrated in FIGS. 1 and 9, these controllers are interconnected by the network medium 160. According to other, non-illustrated embodiments of the invention, various features discussed herein as implemented on one of the controllers 50, 200, 170 may be implemented on another controller with communication via the network medium 160 transmitting data required to perform the functions between the various controllers.

A position feedback system provides knowledge of the location of each mover 100 along the length of the track segment 12 to the segment controller 50. According to one embodiment of the invention, the position feedback system includes one or more position magnets mounted to the mover 100. According to another embodiment of the invention, illustrated in FIG. 6, the position feedback system utilizes the drive magnets 130 as position magnets. Position sensors 145 are positioned along the track segment 12 at a location suitable to detect the magnetic field generated by the drive magnets 130. According to the illustrated embodiment, the position sensors 145 are located below or interspersed with the coils 150. The sensors 145 are positioned such that each of the drive magnets 130 are proximate to the sensor as the mover 100 passes each sensor 145. The sensors 145 are a suitable magnetic field detector including, for example, a Hall Effect sensor, a magneto-diode, an aniso-tropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The position sensors 145 are spaced apart along the length of the track. According to one aspect of the invention, the position sensors 145 are spaced apart such that adjacent position sensors 145 generate a feedback signal which is offset from each other by ninety electrical degrees (90°). Multiple position sensors 145 are, therefore, generating feedback signals in tandem for a single mover 100 as the mover is travelling along the track 10. The feedback signals from each position sensor 145 are provided to a feedback circuit 58 which, in turn, provides a signal to the processor 52 corresponding to the magnet 130 passing the sensor 145.

The segment controller 50 also includes a communication interface 56 that receives communications from the node controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. With reference again to FIG. 1, a DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential. According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the embodiment illustrated in FIG. 9, three legs are shown. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg may also be referred to herein as an upper switch, and the second switching device 74b in each leg may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 130 on each mover 100 to control motion of the movers 100 along the track segment 12.

Figure 10:
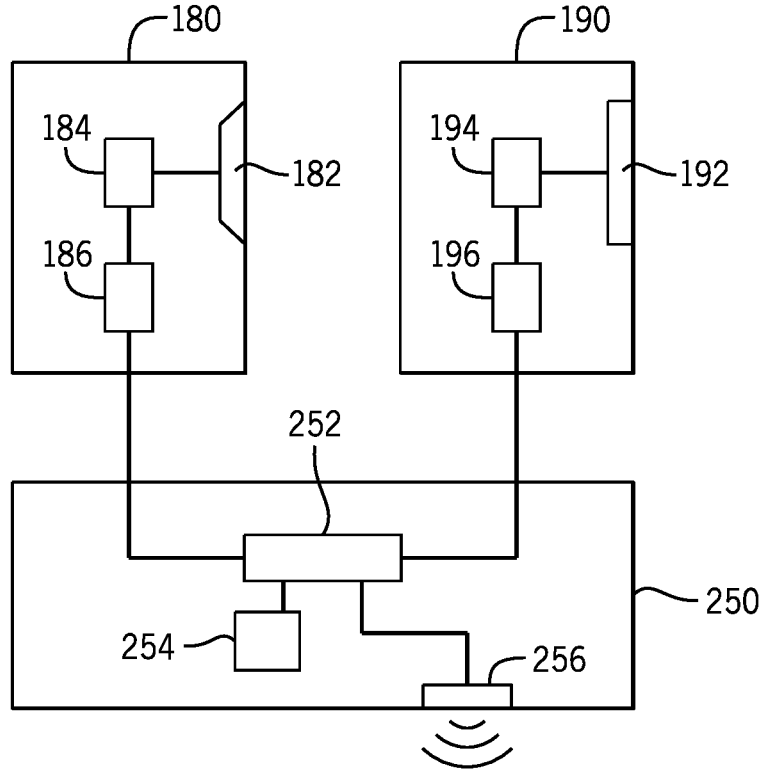
FIG. 10 is a block diagram representation of an exemplary controller mounted on the mover of FIG. 2.

With reference next to FIG. 10, the mover 100 includes a control circuit 250 to communicate data between the mover and another controller external from the mover. The illustrated control circuit 250 includes a processor 252 and memory 254. The memory 254 is configured to store instructions and data, and the processor 252 is configured to execute the stored instructions. The control circuit 250 also includes a wireless interface 256, where the wireless interface transmits and receives data from another wireless interface external from the mover 100. According to one aspect of the invention, each segment controller 50 includes a wireless interface 55 with which the mover 100 may communicate as the mover 100 is travelling along the track 10. According to another aspect of the invention, one or more transceivers are stationed at intervals along the track 10. The intervals may be close enough to permit continuous communication between the mover 100 and one of the transceivers or the intervals may be distant enough such that the mover 100 is only able to transmit data between the mover and the transceiver when the mover 100 is within certain areas of the track 10 that are within communication range of the transceiver.

The mover 100 further includes at least one sensor configured to detect information regarding the environment in which the independent cart system is operating. According to the illustrated embodiment, a camera 180 is mounted on the mover 100. The camera 180 includes a lens 182 to receive light, where the lens directs light incident on the lens to an imaging sensor 184 within the camera 180. The lens 182 and the imaging sensor 184 may be configured to receive visible light, infrared light, ultraviolet light, or any other desired range of electromagnetic radiation for monitoring the operating conditions of the environment. The imaging sensor 184 converts the received light into a digital feedback signal and provides the signal to a control circuit 186 within the camera 180. The control circuit 186 may include discrete logic elements and be configured to pass the feedback signal directly to the processor 252 in the control circuit 250. Optionally, the control circuit 186 may include memory with stored instructions and a processor to execute the stored instructions such that the camera 180 may perform some initial processing on the feedback signal from the imaging sensor 184 prior to transmitting the feedback signal to the control circuit 250. According to still another embodiment, the camera 180 may include a wireless interface and communicate directly with another wireless interface remote from the mover 100. The control circuit 186 may further provide a clock signal to time stamp feedback signals from the camera 180.

The illustrated embodiment further includes one additional sensor 190 mounted on the mover 100. The additional sensor 190 may be any suitable sensor such as a temperature sensor, humidity sensor, or acoustical sensor to detect an operating state of the environment in which the independent cart system is operating. The sensor 190 may require an external probe device 192 to detect the desired operating state and a transducer 194 to convert a signal corresponding to the detected operating state into a digital feedback signal for a control circuit 196 within the sensor 190. In some embodiments, the probe 192 and transducer 194 are combined as a single element. The control circuit 196 may include discrete logic elements and be configured to pass the feedback signal directly to the processor 252 in the control circuit 250. Optionally, the control circuit 196 may include memory with stored instructions and a processor to execute the stored instructions such that the sensor 190 may perform some initial processing on the feedback signal from the transducer 194 prior to transmitting the feedback signal to the control circuit 250. According to still another embodiment, the sensor 190 may include a wireless interface and communicate directly with another wireless interface remote from the mover 100. The control circuit 196 may further provide a clock signal to time stamp feedback signals from the sensor 190.

In operation, the independent cart system monitors data about the environment in which the system is deployed. The movers 100 in the independent cart system are commanded to travel along the track 10 according to the application requirements. The movers 100 may travel continuously, may start and stop at different stations, or a combination thereof. Some movers 100 may travel around a single loop of a larger system while other movers 100 may transit multiple loops or travel throughout the entire independent cart system. As previously discussed, independent cart systems are being deployed in numerous applications. A process line, or multiple parallel process lines, may have tracks 10 extending past external machinery which loads payload onto the mover 100, performs one or more tasks, such as filling, labeling, machining, assembly, packaging, or the like, and then unloads the payload from the mover 100. A fulfillment center may have multiple tracks 10 extending throughout the center, where movers 100 are commanded to travel past various stations to receive one or more products to complete an order. The mover 100 may then return to an unloading station where the completed order is processed for pickup or delivery. Automation of the process line or of the fulfillment process is intended to reduce the number of people required to complete the task. Thus, regular observation by an operator or technician of the environment through which the movers 100 travel may not occur.

Figure 11:
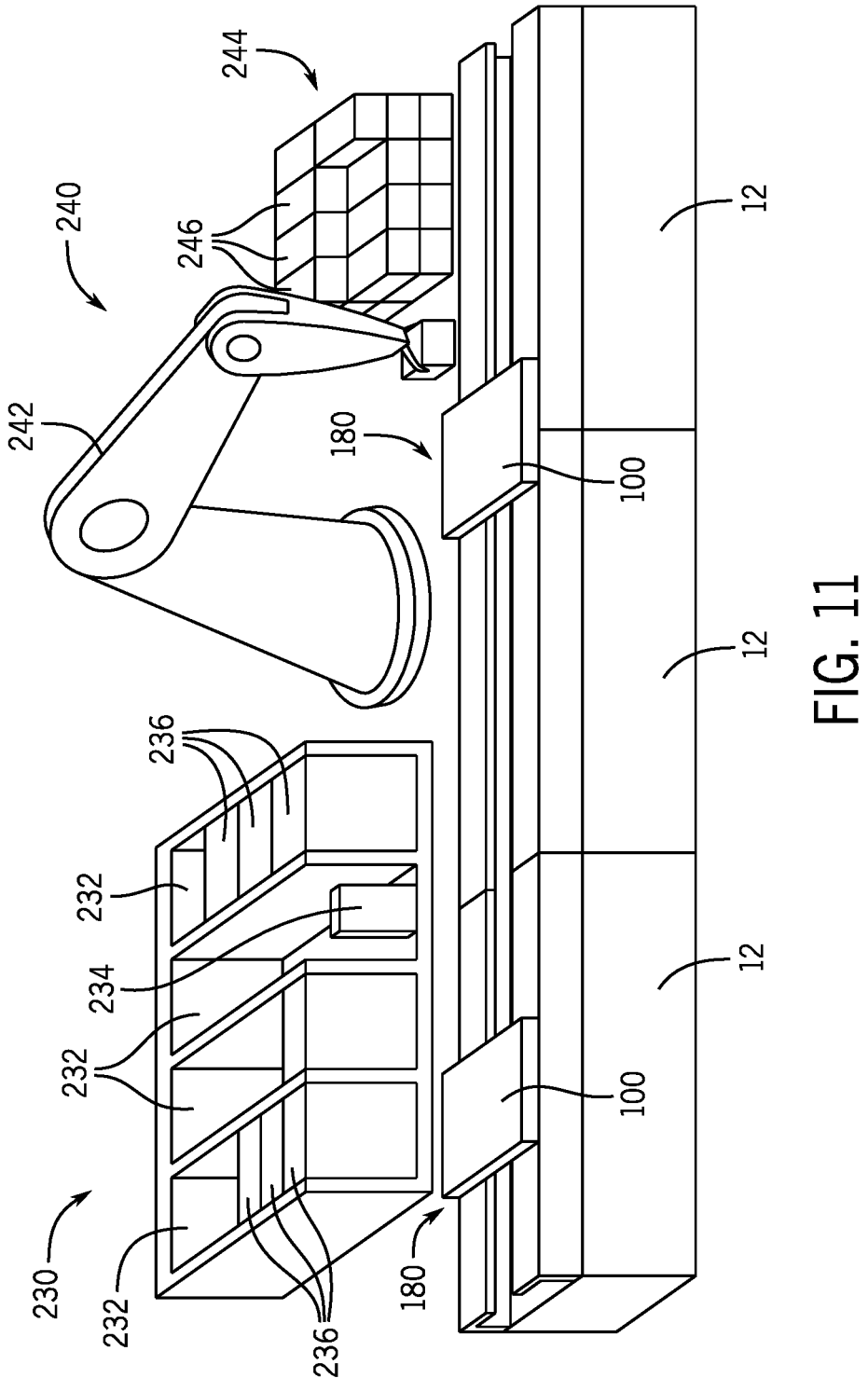
FIG. 11 is a perspective view of an exemplary application for the independent cart system of FIG. 1.

Using a camera 180, the mover 100 is able to inspect the environment through which it travels. According to a first aspect of the invention, images generated by the camera provide status of locations by which the mover 100 travels. In the fulfillment center application, the camera 180 is mounted on the mover 100 such that the field of view for the camera 180 detects a loading area from the stations by which the mover 100 travels. Multiple cameras 180 may be provided to monitor stations on each side of the track 10 from which the mover 100 receives payload. Turning next to FIG. 11, an exemplary independent cart system is illustrated passing two different types of fulfillment stations 230, 240.

A first fulfillment station 230 includes multiple compartments 232 in which product 236 is located. According to the illustrated embodiment, each compartment 232 defines a slot in which the product 236 is arranged. An actuator 234 moves the product forward in the slot and delivers the product 236 onto a mover 100 passing the slot. The product 236 may be the same in multiple compartments 232 and/or different products 236 may be included in each compartment 232 and selected to fulfill an order corresponding to each mover 100. A second fulfillment station 240 includes a pallet 244 stacked with product 246. A robotic arm 242 has a range of motion to reach between the pallet 244 and a mover 100 traveling past the pallet. The robotic arm 242 is programmed to transfer the product 236 between the pallet 244 and the mover 100 as the mover 100 travels past the robot. The two illustrated fulfillment stations 230, 240 are intended to be exemplary and not limiting. It is understood that fulfillment stations having various other configurations for delivering a product to the mover may be utilized.

A camera 180 is mounted on the interior side of the mover 100, facing the fulfillment station 230 or 240, and the camera 180 captures information about the fulfillment station 230 or 240 as the mover 100 travels by the station. Images from the camera 180 may be stored in memory 254 of the control circuit 250 on the mover 100 or, optionally, in memory of the camera 180 itself. The images may be transmitted to a segment controller 50 via the wireless interfaces 256, 55 as the mover 100 is controlled by the segment controller 50 or, optionally, multiple images may be stored and transmitted to a transceiver at a station dedicated to receiving the images. According to still another aspect of the invention, the camera 180 may be configured to record video of the fulfillment station 230 or of any portion of the environment through which the track 10 passes. The video may similarly be communicated via the wireless interfaces 256, 55 to the segment controller 50 or to a receiver remote from the mover 100.

The images and/or video are, in turn, transmitted from the segment controller 50 or from another receiving station to the machine learning model. The machine learning model is trained to detect various operating conditions within the fulfillment center. The operating conditions to be detected include, but are not limited to, whether a slot 232 or pallet 244 has product 236, 246 or is empty, whether product 236, 246 is damaged, whether product is incorrectly oriented within the slot 232 or on the pallet 244 which may result in incorrect loading or jamming of the fulfillment process, and/or whether the correct product 236, 246 is loaded into a slot 232 or present on the pallet 244. For case of discussion, the machine learning model will be described herein as executing on the edge controller 260. The described embodiment is not intended to be limiting. It is understood that the machine learning model may be implemented in part or in whole either locally on the edge controller 260 or remotely on the data processing center 280. According to one aspect of the invention, the machine learning model may provide for supervised learning of the independent cart system. With supervised learning, at least one model related to the environment through which the mover 100 is traveling is stored in memory 268.

Each model is configured to predict expected conditions within the environment as a function of one or more inputs to the model. The complexity of the models depends, at least in part, on the complexity of the application and of the desired prediction. For example, if a model is to predict when a product 236, 246 in a slot 232 or on the pallet 244 is to be exhausted, the model may require just a number of items that fit in the slot or on the pallet and receive an input when a product is requested. The model may then predict a time at which the slot 232 or pallet 244 will be empty. Alternately, an application may wish to verify the product present in the slot 232 or on the pallet 244 is correct or is properly oriented to permit correct loading onto the mover 100. The edge controller 260 may receive the images or videos from the segment controller 50 or from the dedicated receiver station and perform various processing steps on the images or videos. The image processing may be used for image recognition, where the edge controller 260 matches the image of a product 236, 246 present in the slot 232 or on the pallet 244 to an image stored in the edge controller 260. Similarly, the edge controller 260 may detect a variation in the image that may indicate the product 236, 246 is damaged or that the product is in a different orientation than the expected orientation that would impact loading onto the mover.

The supervised learning provides an initial prediction of the product present along the track, while the images and/or videos provided from the cameras 180 verify the models and further identify trends that permit successful operation or predict unsuccessful operation of the fulfillment station 230, 240. The models for supervised learning are supplemented by monitoring operation of the fulfillment stations 230, 240 as the movers 100 travel in the independent cart system.

Under ideal operating conditions, precise models of operation provided to the machine learning model would provide accurate predictions for operation of the fulfillment center. However, models of operation may not account for every operating condition. Further, manufacturing and assembly tolerances create variation in operation between stations 230, 240; between actuators 234 or robots 242 configured to load product onto movers 100, between individual movers 100 travelling along the track 10, or between the cameras 180 or additional sensors 190 mounted on each mover 100. Manufacturing tolerances in sensors result in different feedback signals between different sensors that are manufactured in an identical fashion. As a result, even the most precise model of operation will not provide an exact prediction of the operation of each station 230, 240 or the interaction of each station 230, 240 with various movers 100. Utilizing various inputs corresponding to the operating conditions in the monitored application, the machine learning model adapts the predictions over time as a function of the actual operation for each application. The machine learning model observes differences between predicted operation and observed operation and adapts the models to account for actual performance. As a result, the predictions improve over time observing the actual performance of the independent cart system.

According to another aspect of the invention, the machine learning model may provide unsupervised learning of the independent cart system. With unsupervised learning, the machine learning model has no initial model of operation. The machine learning model still receives the input signals. The input signals include the images and/or videos from the cameras 180 and may further include feedback signals from additional sensors 190 mounted on each mover 100. The machine learning model monitors the input signals for multiple runs of each mover 100 along the track. The machine learning model detects patterns of operation for the application as a function of the inputs over the series of runs. Over time, the machine learning model generates patterns of operation for the fulfillment center, process line, or other application in which the independent cart system is operating. According to still another aspect of the invention, the machine learning model may be, in part, supervised and, in part, unsupervised. The machine learning model may receive models for some aspects of the environment in which the independent cart system is installed and may monitor other aspects of the environment to detect patterns of operation without having models of operation for those aspects of the system.

Figure 12:
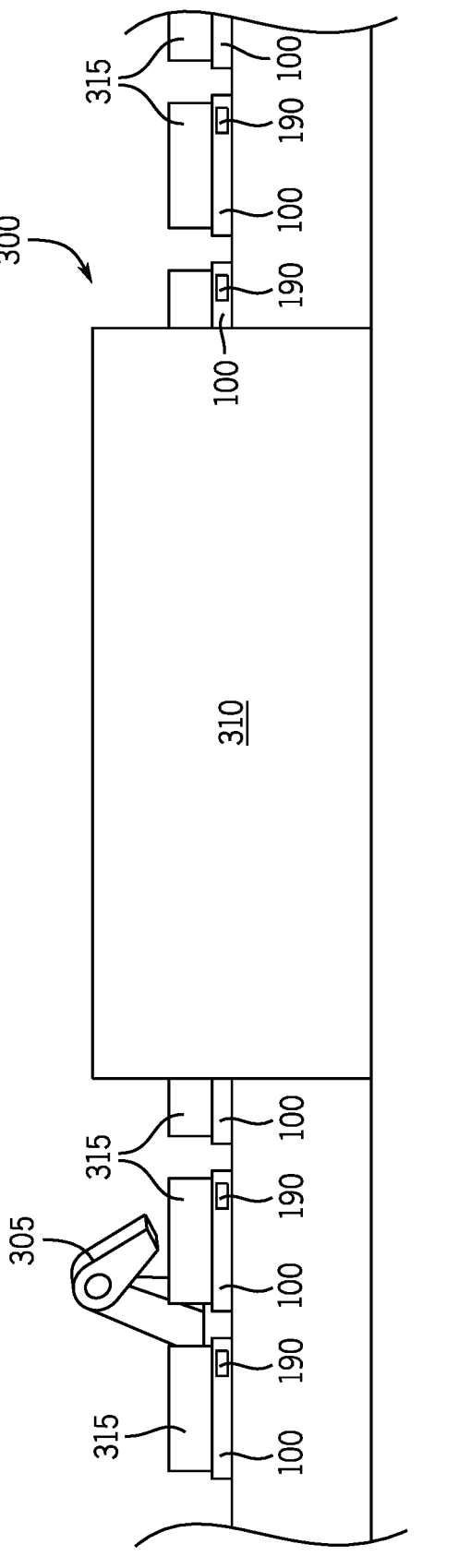
FIG. 12 is a side elevational view of another exemplary application for the independent cart system of FIG. 1.

Turning next to FIG. 12, another exemplary independent art system is illustrated as part of a process line 300. The process line 300 includes a robot 305 performing a task with respect to a payload 315 present on each mover 100. The movers 100 and their payload 315 then travel through an enclosed region 310. The enclosed region may, for example, apply a surface treatment to the payload, provide a heat treatment, pass through an ultraviolet light or other curing process, or perform still other processes on the payload 315. Cameras 180 mounted on the mover 100 may monitor various actuators and mechanisms within the enclosed region 310 for proper operation. Various ambient conditions such as heat, humidity, noise, or the like may be observed with sensors 190 mounted on each mover 100. The illustrated embodiment includes a sensor 190 or group of sensors mounted to each mover 100. The sensors generate a feedback signal corresponding to the measured operating state within the enclosed region 310. The feedback signals may be sampled and values stored in memory 254 of the control circuit 250 on the mover 100 or, optionally, in memory of the sensor 190 itself. The sampled values of the feedback signal may be transmitted to a segment controller 50 via the wireless interfaces 256, 55 as the mover 100 is controlled by the segment controller 50 or, optionally, multiple values may be stored and transmitted to a transceiver at a station dedicated to receiving the sampled values.

The sampled values are, in turn, transmitted from the segment controller 50 or other receiving station to the machine learning model. The machine learning model is trained to detect various operating conditions within the enclosed region 310. The operating conditions to be detected vary as a function of the type of sensor. The operating conditions may be instantaneous values captured asynchronously to a process performed within the enclosed region 310 or a series of values synchronously monitoring performance of the process. For case of discussion, the machine learning model will be described herein as executing on the edge controller 260. The described embodiment is not intended to be limiting. It is understood that the machine learning model may be implemented in part or in whole either locally on the edge controller 260 or remotely on the data processing center 280. According to one aspect of the invention, the machine learning model may provide for supervised learning of the independent cart system. With supervised learning, at least one model related to the environment through which the mover 100 is traveling is stored in memory 268. The monitored values may be provided to either a supervised or unsupervised machine learning system in a manner similar to that described above with respect to the cameras 180 to detect trends in the feedback signal generated by the sensors 190 mounted on each mover 100.

According to still another aspect of the invention, a time of travel for each mover 100 may be monitored. In one embodiment a central controller, such as the industrial controller 200 or another dedicated fleet manager monitors the location of each mover 100. The central controller issues commands for a mover 100 to travel between locations. The central controller may use a clock circuit executing within the central controller to store a first timestamp corresponding to a time that the command is sent to the mover 100 and to store a second timestamp corresponding to a time that the central controller receives a feedback signal indicating the mover 100 has arrived at the desired position. The feedback signal may be generated by an external sensor detecting the presence of the mover 100 or a signal generated by the segment controller 50 responsible for controlling operation of the mover 100.

In another embodiment of the invention, a first segment controller 50 receives a command indicating that a mover 100 present on the corresponding track segment 12 is required at another location. The first segment controller 50 generates a timestamp indicating when the mover 100 begins travelling on the corresponding track segment 12. In some independent cart systems, each segment controller 50 may have a clock synchronized in time with the other segment controllers. If the clocks are synchronized, the first segment controller 50 may simply transmit the timestamp corresponding to when the mover 100 began traveling to the adjacent segment controller 50 as the mover transitions between track segments 12. Each successive segment controller 50 transmits the timestamp until the final segment controller 50 on the track segment corresponding to the desired location for the mover 100 controls operation of the mover to arrive at the desired location. The final segment controller 50 obtains a second timestamp and determines the total time of travel for the mover 100. In other independent cart systems, each segment controller 50 has a clock operating asynchronously from the other segment controllers. Rather than passing the timestamp, each segment controller 50 determines a total time of travel for the mover 100 on the corresponding track segment 12. The segment controller 50 determines a running total of the total travel time by adding the time the mover 100 is operating on the corresponding track segment 12 to a prior total for which the mover was operating on previous track segments. The segment controller 50 may pass the running total to the next segment controller 50 such that a total travel time for each mover 100 may be determined.

According to still another aspect of the invention, the travel time for each mover 100 may be provided as an input to the machine learning model on the edge controller 260. With reference again to the fulfillment center example of FIG. 11, the independent cart system may include multiple paths that traverse past numerous fulfillment stations 230, 240. An order management system may be in communication with the industrial controller 200 and the edge controller 260 to provide efficient order fulfillment. The order management system may receive an order with one or more items. The order management system generates commands for one or more movers 100 to travel through the fulfillment center to retrieve each of the items in the order from a fulfillment station. As a mover 100 travels along the independent cart system, the travel times are provided to the edge controller 260. The machine learning model determines trends in the travel time within the independent cart system. These trends include, for example, a time to retrieve a product from the fulfillment center or traffic congestion along different track segments in the independent cart system. The trends may identify popular products within the independent cart system. These trends may be utilized within the fulfillment center to position popular products at intervals such that traffic is spaced apart within the fulfillment center. Conversely, if a trend identifies multiple products that are often purchased together, the trend may allow these products to be located next to each other to minimize the travel time of a mover 100 between the items. According to still another feature of the invention, the travel times may be used to route movers 100 around track segments where the trends identify traffic is typically greater when the mover 100 is not required to retrieve a product from that region.

In addition to the traffic trends, the order management system may utilize the image feedback information to improve efficiency in the fulfillment center. The edge controller 260 may transmit image and/or video data directly to the order management system. Alternately, the edge controller 260 has performed initial processing on the image and/or video data. As discussed above, the edge controller 260 may perform image recognition. Having identified and/or verified the product 236, 246 present at a fulfillment station 230, 240, the edge controller 260 may transmit an identifier corresponding to the identified image to the order management system. Further, the edge controller 260 may detect trends in the inventory levels of products 236, 246 located in the fulfillment center. The trends may be transmitted to the order management system and used to improve scheduling delivers of product to restock inventory in the order fulfillment center.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A system for collecting data about an environment in which an independent cart system is operating, the system comprising:

a track extending through the environment;

a mover mounted on the track and operative to travel along the track;

a sensor mounted on the mover, wherein the sensor generates a feedback signal corresponding to a condition external from the mover as the mover travels along the track;

a memory operative to store a plurality of instructions and a plurality of values of the feedback signal; and a controller operative to execute the plurality of instructions to:

receive the feedback signal from the sensor, and periodically store a value of the feedback signal in the memory.

2. The system of claim 1, wherein the sensor is a camera mounted on the mover.

3. The system of claim 2, wherein the controller is further operative to execute the plurality of instructions to:

perform image recognition as a function of the feedback signal from the camera, and transmit an identifier to another controller responsive to performing the image recognition, wherein the identifier corresponds to an image recognized from the feedback signal.

4. The system of claim 2, wherein the controller is further operative to execute the plurality of instructions to detect at least one trend in the feedback signal as a function of the plurality of values of the feedback signal.

5. The system of claim 4, wherein the at least one trend is a present inventory level of a payload to be loaded on the mover.

6. The system of claim 1, wherein the sensor is selected from one of a temperature sensor, a humidity sensor, an acoustical sensor, an infrared sensor, and a clock.

7. The system of claim 5, wherein the controller is further operative to execute the plurality of instructions to detect at least one trend in the feedback signal as a function of the plurality of values of the feedback signal.

8. The system of claim 7, wherein the trend is a time to deliver a payload present on the mover.

9. The system of claim 1, wherein:

the memory is further operative to store at least one model of the condition monitored by the feedback signal in the memory; and the controller is further operative to:

determine a prediction of a trend in the feedback signal as a function of the at least one model.

10. A method for collecting data about an environment in which an independent cart system is operating, the method comprising the steps of:

controlling a mover to travel along a track of the independent cart system, wherein the track extends through the environment;

receiving a feedback signal at a controller from a sensor mounted on the mover, wherein the sensor generates the feedback signal corresponding to a condition external from the mover as the mover travels along the track;

periodically storing a value of the feedback signal in a memory in communication with the controller; and detecting a trend in the feedback signal as a function of the values of the feedback signal stored in the memory.

11. The method of claim 10, further comprising the steps of:

storing at least one model of the condition monitored by the feedback signal in the memory; and determining a prediction of the trend as a function of the at least one model.

12. The method of claim 11, wherein the trend in the feedback signal is detected as a function of the values of the feedback signal stored in the memory and of the prediction.

13. The method of claim 10, wherein the sensor is a camera mounted on the mover.

14. The method of claim 13, further comprising the steps of:

identifying an image with a controller for the independent cart system as a function of the feedback signal from the camera, and transmitting a signal to another controller responsive to identifying the image, wherein the signal corresponds to the image identified.

15. A system for collecting data about an environment in which an independent cart system is operating, the system comprising:

a sensor mounted on a mover operative to travel along a track for the independent cart system, wherein the sensor generates a feedback signal corresponding to a condition external from the mover as the mover travels along the track;

a memory operative to store a plurality of instructions and a plurality of values of the feedback signal; and a controller operative to execute the plurality of instructions to:

receive the feedback signal from the sensor, and periodically store a value of the feedback signal in the memory, and detect at least one trend in the feedback signal as a function of the plurality of values of the feedback signal.

16. The system of claim 15, wherein the sensor is a camera mounted on the mover.

17. The system of claim 16, wherein the controller is further operative to execute the plurality of instructions to:

perform image recognition as a function of the feedback signal from the camera, and transmit an identifier to another controller responsive to performing the image recognition, wherein the identifier corresponds to an image recognized from the feedback signal.

18. The system of claim 15, wherein the sensor is selected from one of a temperature sensor, a humidity sensor, an acoustical sensor, an infrared sensor, and a clock.

19. The system of claim 15, wherein:

the memory is further operative to store at least one model of the condition monitored by the feedback signal in the memory; and the controller is further operative to determine a prediction of the at least one trend as a function of the at least one model.

20. The system of claim 19, wherein the at least one trend in the feedback signal is detected as a function of the values of the plurality of values of the feedback signal stored in the memory and of the prediction.

\* \* \* \* \*